United States Patent [19]

Upton et al.

[11] 4,154,324
[45] May 15, 1979

[54] SWITCHING REEL FOR ELECTRICAL CABLE

[76] Inventors: Terrence H. Upton, 5817 N. Clark St., Chicago, Ill. 60660; William Nicholas, 1415 W. Pratt Blvd., Chicago, Ill. 60626

[21] Appl. No.: 736,083

[22] Filed: Oct. 27, 1976

Related U.S. Application Data

[63] Continuation of Ser. No. 492,495, Jul. 29, 1974, abandoned.

[51] Int. Cl.² .............................................. H02G 11/02
[52] U.S. Cl. .............................. 191/12.2 R; 200/61.15; 200/153 F; 339/5 RL
[58] Field of Search ............................ 191/12.2 R, 12.4; 200/153 F, 65.15, 65.16, 65.58 B; 339/5 RL

[56] References Cited

U.S. PATENT DOCUMENTS

| | | | |
|---|---|---|---|
| 1,600,209 | 9/1926 | Appleton et al. | 200/153 F |
| 1,659,293 | 2/1928 | Hermann | 200/153 F |
| 2,438,082 | 3/1948 | Wester et al. | 200/153 F |
| 2,453,407 | 11/1948 | Burns | 200/153 F |
| 2,530,773 | 11/1950 | Johnson et al. | 191/12.4 |
| 2,896,659 | 7/1959 | Erickson | 242/86 X |
| 2,907,534 | 10/1959 | Benstein | 242/86 |

Primary Examiner—Robert J. Spar
Assistant Examiner—Frederick R. Handren
Attorney, Agent, or Firm—Allegretti, Newitt, Witcoff & McAndrews

[57] ABSTRACT

A reel assembly for an electrical cable wherein the electrical cable is de-energized during winding and unwinding thereof.

6 Claims, 12 Drawing Figures

SWITCHING REEL FOR ELECTRICAL CABLE

This is a continuation of application Ser. No. 492,495, filed July 29, 1974, now abandoned.

BACKGROUND AND SUMMARY OF THE INVENTION

The present invention relates to a reel assembly for service station tow vehicles and the like. The starter "jump" cable, a single dual cable for ease of handling, is wound upon a spring-biased reel. The cable is split at each free end for connection to a power source, e.g. a starting battery, and for connection to a vehicle battery. The present invention includes switch means to de-energize the cable during unwinding from the reel and to automatically energize the cable when the area of the battery of the disabled car is reached.

BRIEF DESCRIPTION OF THE DRAWINGS

A preferred embodiment of the present invention is shown, in detail, in the drawings, wherein.

DESCRIPTION OF THE PREFERRED EMBODIMENTS

Figure 1:
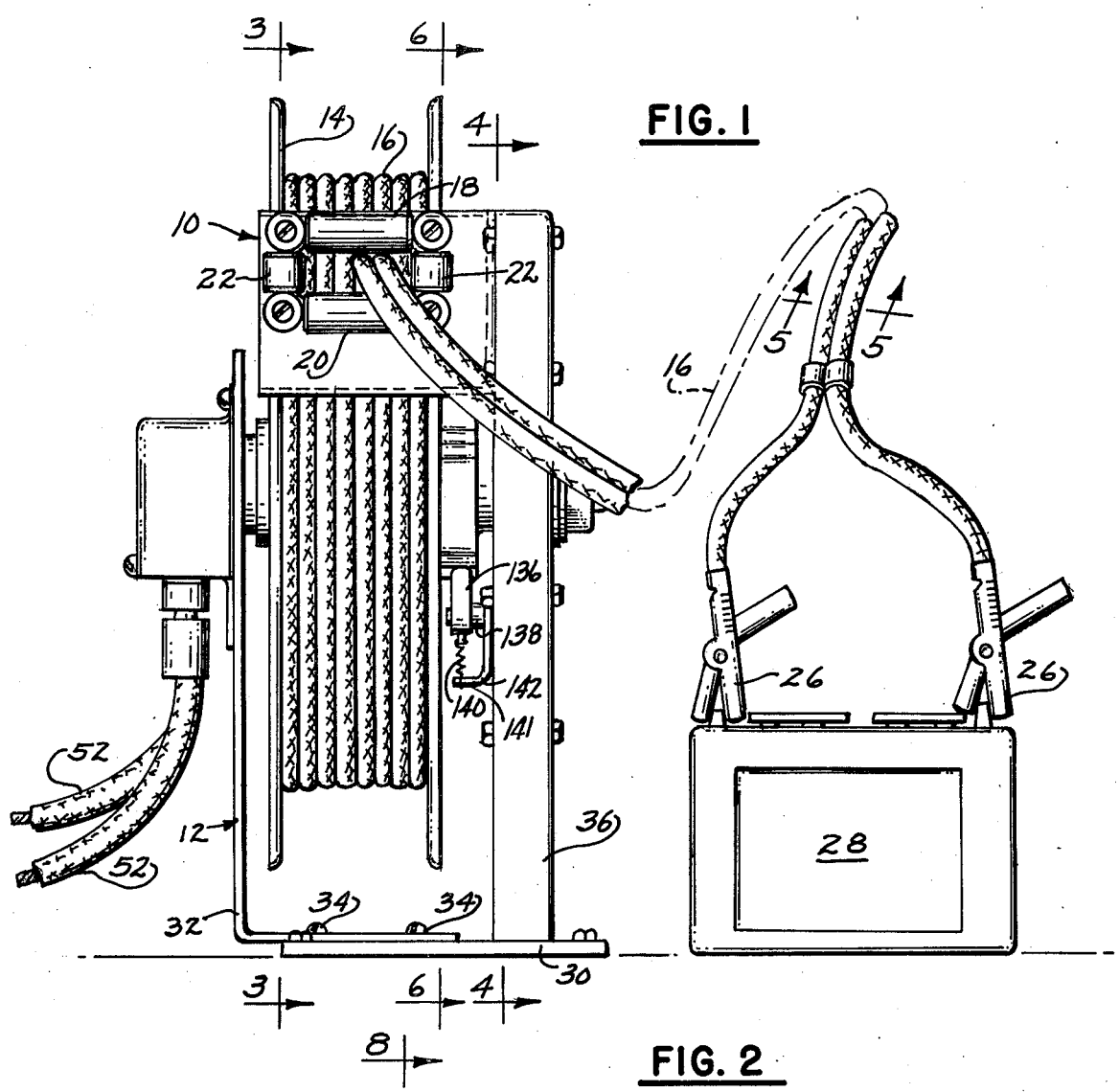
FIG. 1 is an end view of a preferred embodiment of the present invention with the dual cable connected to a discharged battery.
Figure 2:
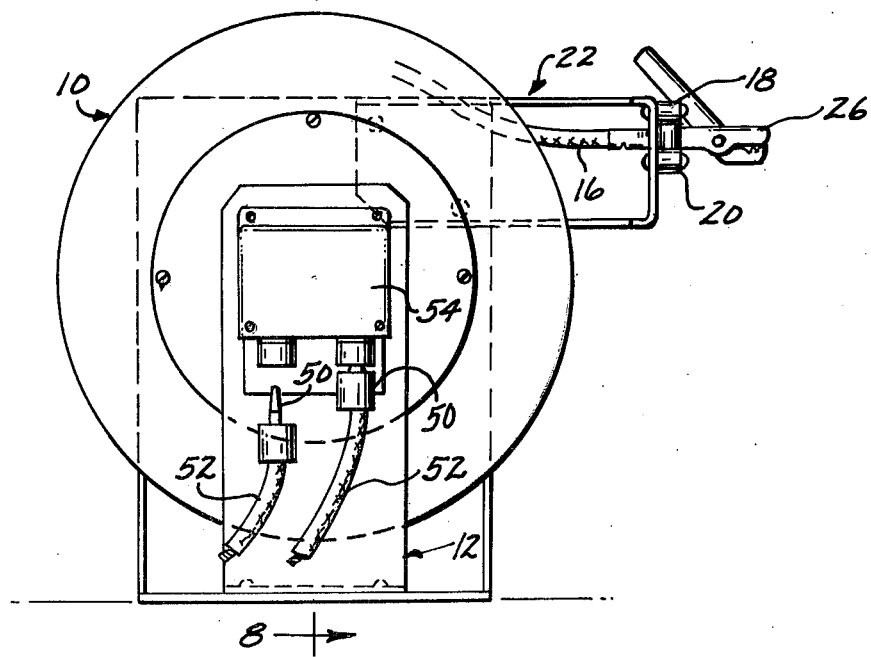
FIG. 2 is a side view of the reel assembly of FIG. 1 with the dual cable retracted.

Referring now to the drawings and more particularly to FIG. 1, a preferred embodiment of the present invention is shown as a reel assembly 10, which includes a housing 12, a reel 14, a dual cable 16, and cable dispensing rollers 18 and 20 forming a part of a cable dispensing assembly 22. One end of the cable 16 is split to form separate conductors. An alligator clip 26 is secured to each separate conductor, as shown.

The housing 12 includes a base 30 and an L-shaped standard 32. The L-shaped standard 32 is secured to the base 30 by fastening elements 34. An upright standard 36 is also secured to the base 30 and defines a chamber 37, as particularly shown in FIG. 4. A spiral spring 38 is mounted within the chamber 37. One end of the spring 38 is secured to the housing 12 or more particularly a catch 42 on the upright standard 36. The other end of the spiral spring 38 forms a ring 40.

Figure 4:
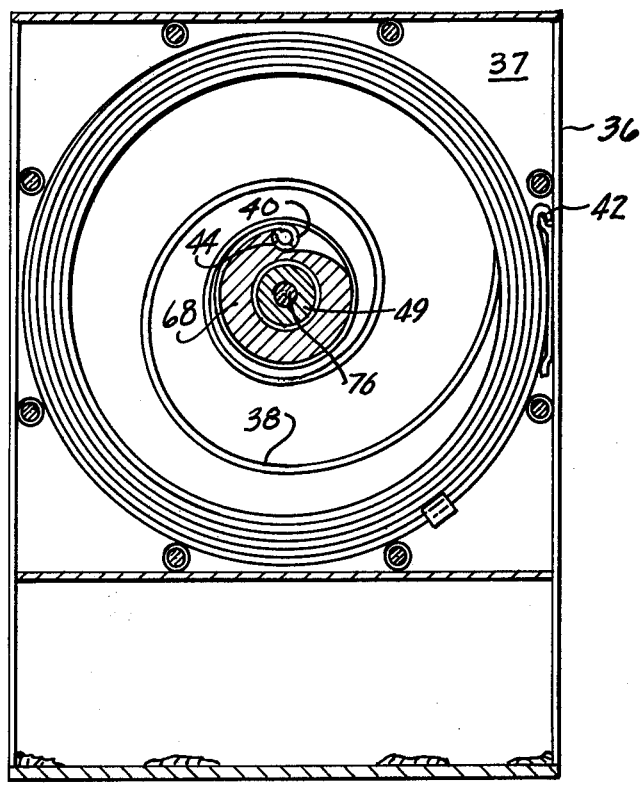
FIG. 4 is an cross sectional view taken substantially on line 4—4 of FIG. 1.
Figure 8:
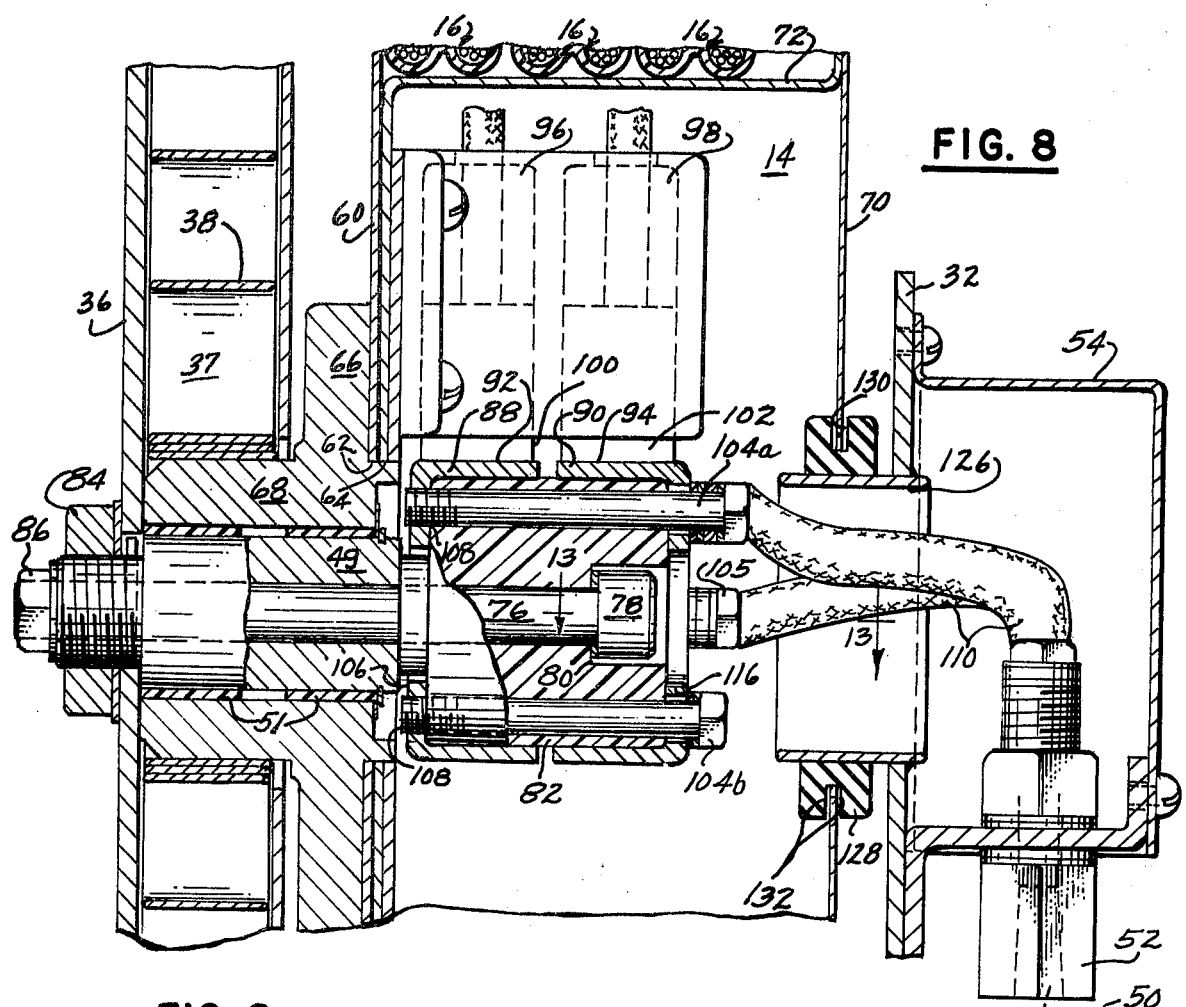
FIG. 8 is a greatly enlarged cross sectional view taken substantially on line 8—8 of FIG. 2.

Referring primarily to FIGS. 4 and 8, an insulating bushing 49 is secured to the upright standard 36 by a central rod 76, threaded to receive a nut 86. A second bushing 68 is rotatably mounted on the bushing 49 and includes a recess 44. The reel 14 is secured in part to the second bushing 68, as described further below.

The ring 40 of the spiral spring 38 engages the recess 44. As such, the spiral spring 38 biases the reel 14 to a first position wherein the cable 16 is fully wound upon the reel 14. The reel 14 and bushing 68 rotate about the bushing 49 as the cable 16 is withdrawn or paid out.

Power is supplied to the reel assembly 10 by means of tapered plugs 50. The plugs 50 are mounted on the end of a conductor cable 52 connected to an appropriate power source (not shown). The plugs 50 are received in correspondingly formed sockets within a housing 54 mounted on the L-shaped standard 32.

Figure 5:
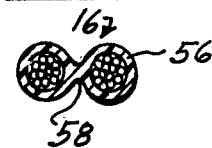
FIG. 5 is an enlarged sectional view of the dual cable shown in FIG. 1 taken substantially along line 5—5.

In FIG. 5, a preferred configuration of the cable 16 is shown. The insulating coating 56 has a web 58 maintaining the two conductors of the cable 16 in spaced relation so that the cable 16 can be readily handled as a unit.

Figure 7:
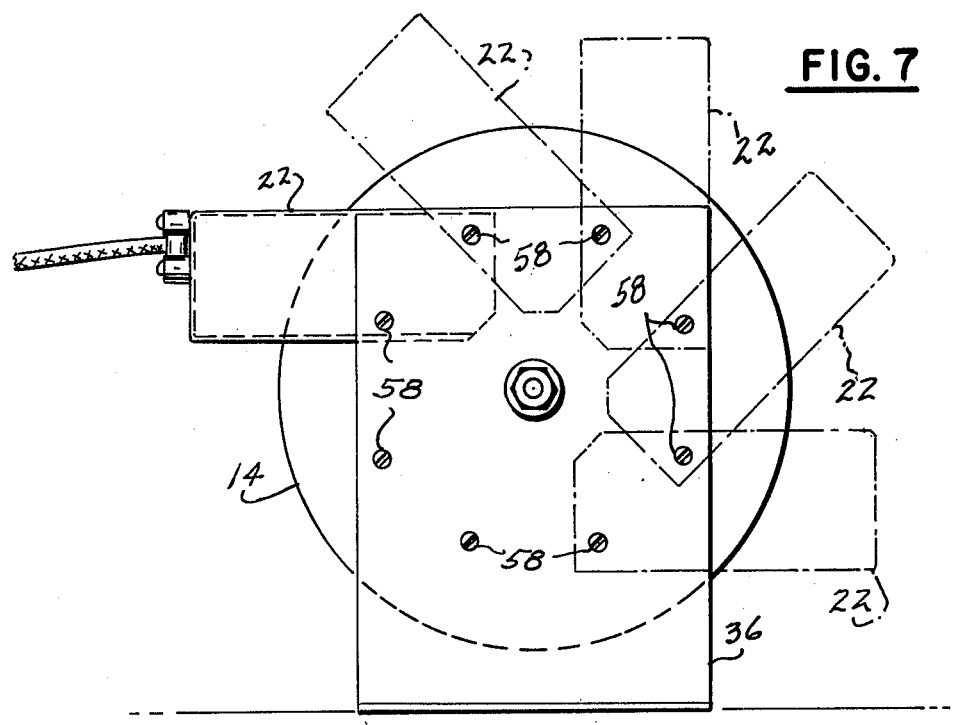
FIG. 7 is a side view illustrating the cable dispensing housing and mounting thereof.
Figure 6:
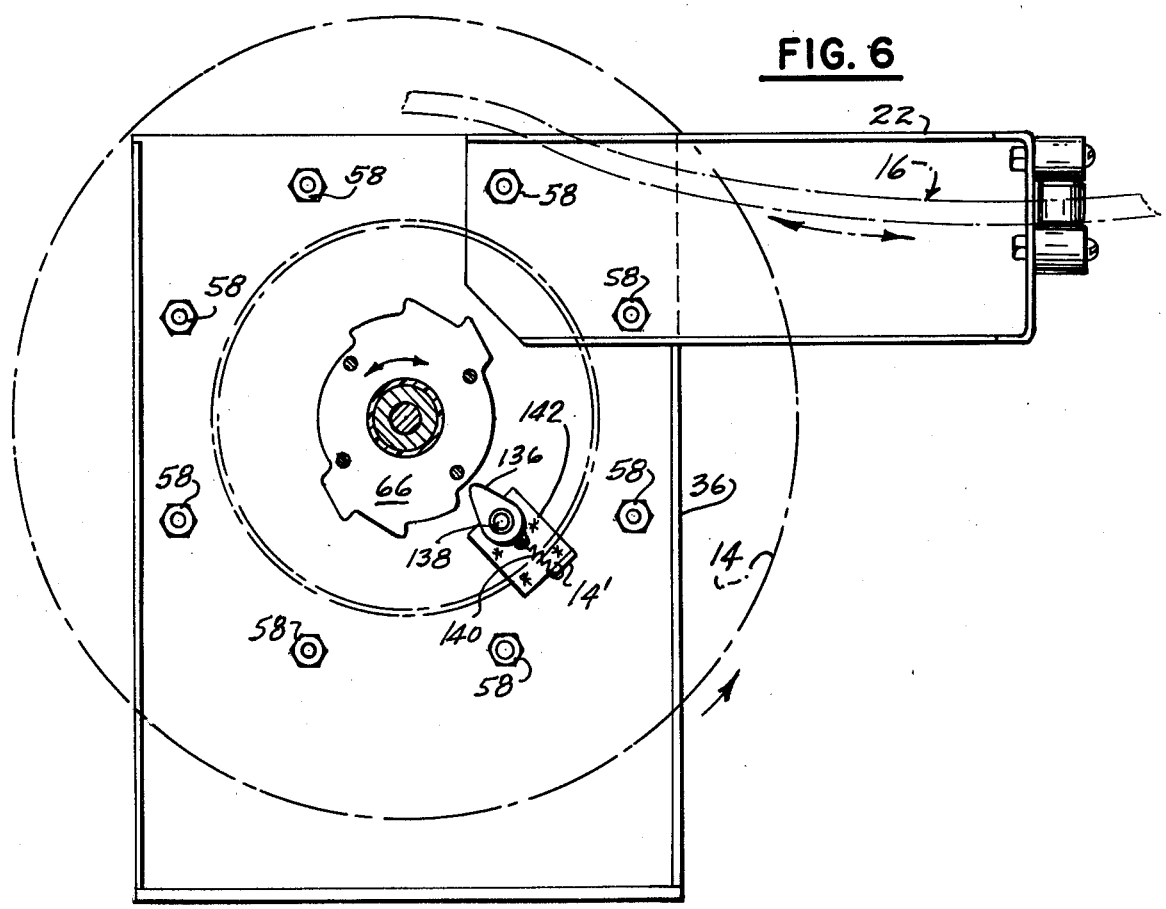
FIG. 6 is an cross sectional view of the reel assembly of the preferred embodiment shown in FIG. 1 taken substantially on line 6—6 of FIG. 1.

As shown in FIGS. 6 and 7, the cable dispenser assembly 22 is mounted on the standard 36 by means of two capscrews 58. Capscrews 58 are affixed to the upright standard 36, circumferentially evenly spaced so the assembly 22 can be mounted in any one of several positions, as illustrated in FIG. 7.

Referring now to FIG. 8, the reel 14 has an annular end plate 60 provided with a central opening 62. The central opening 62 receives the rotatable bushing 68 and the reel 14 is secured thereto.

The bushing 68 includes an outwardly extending lip 64 and an integrally formed ratchet 66. The central opening 62 particularly engages the outer surface of the lip 64. As shown, the bushing 49, bushing 68 and central rod 76 are substantially coaxial.

The reel 14 also includes an annular end plate 70 similar in structure to the plate 60. The plates 60 and 70 are secured and fastened to a Z-shaped member 72, as by welding or the like. The Z-shaped member 72 is adapted to windingly receive the cable 16.

The bushing 49 includes a threaded portion extending through an opening in the upright standard 36. The threaded portion receives a retaining nut 84. As shown, the central rod 76 has a head 78 to secure a third bushing 82 to the bushing 49 and standard 36. The head 78 engages a recess 80 in the bushing 82. Bearing sleeves 51 are provided between the fixed bushing 49 and rotatable bushing 68.

Figure 3:
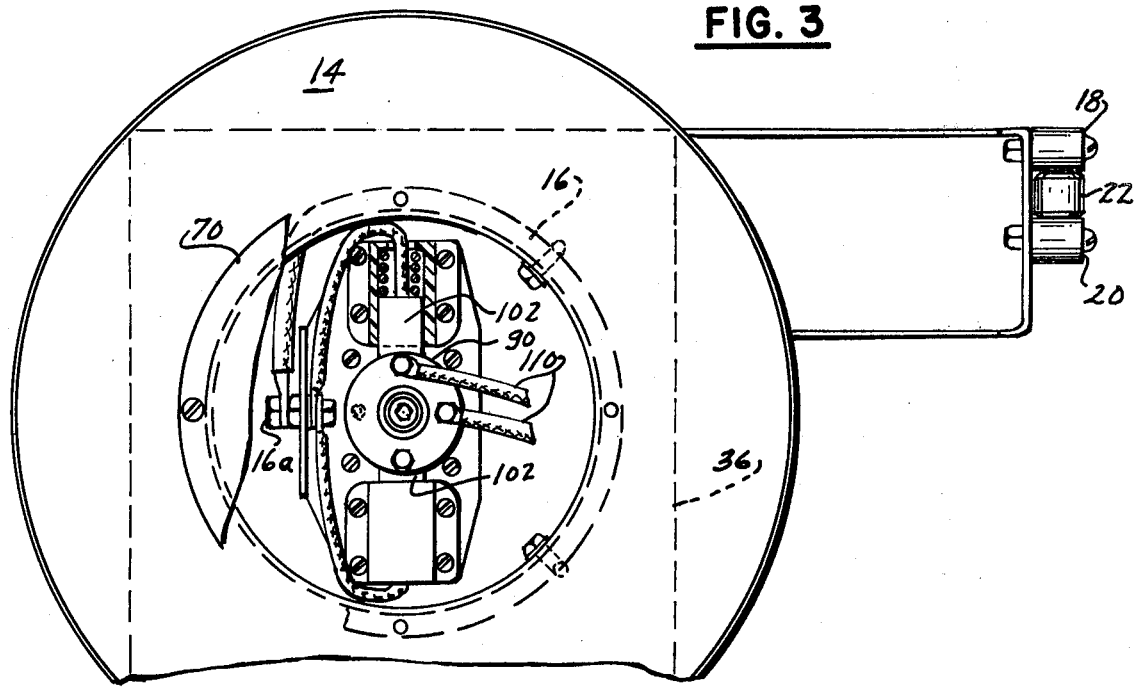
FIG. 3 is a partial cross sectional view of the reel assembly of FIG. 1 taken substantially along line 3—3 of FIG. 1, illustrating a modified interconnection for additional amperage.

A pair of conductive cups 88 and 90, of copper or the like, having side walls 92 and 94, respectively, form collector rings to supply power to the cable 16, despite rotation of the reel 14. Two brush assemblies 96 and 98 having brushes 100 and 102, respectively, interconnect the conductive cups 88 and 90 and the cable 16, as shown in FIG. 8. The connection of cable 16 and the brush assemblies 96 and 98 is shown in FIG. 3 and, generally designated as terminal 16a.

The cups 88 and 90 are mounted on bushing 82 by insulated bolts 104a and 104b. Bolt 104b passes through end wall 116 of the cup 90, through the bushing 82 and is threaded into end wall 106 of the cup 88. Bolt 104a passes through the end wall 116, radially opposite bolt 104b, and is also threaded into the end wall 106 of the cup 88. Bolt 104a is electrically insulated from the cup 90.

A bolt 105 is centrally secured to the end wall 116 of the cup 90. The bolts 104a and 105 are electrically connected to the sockets 52 by means of a dual cable 110.

The cable 110 passes through a ring member 126 secured to the standard 32 and substantially axially aligned with the central rod 76. A seal 128 is mounted on the outer periphery of the ring member 126. The seal 128 includes a circumferential, radially inwardly extending shot 130 adapted to sealingly receive the end wall 70 of the reel 14. The seal 128 provides a dust and water shield.

Referring to FIGS. 1, 6 and 8-10, a pawl 136 cooperates with the ratchet 66 to selectively lock and release the reel 14, such that the cable 16 can be withdrawn for use and then rewound. The pawl 136 rotates about a pin 138, secured to L-shaped support 142. The support 142, having an arm 141, is rigidly secured to the upright standard 36. The pawl 136 is biased to a neutral position, shown in FIG. 6, by a spring 140, interconnecting the pawl 136 and arm 141.

Figure 9:
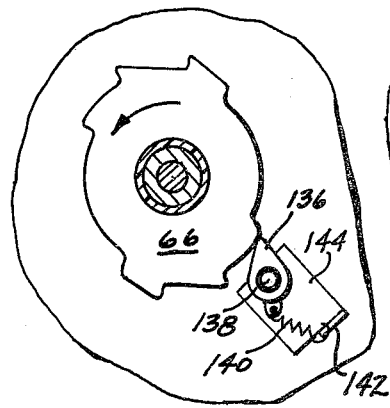
FIG. 9 is a front view of the ratchet assembly forming a part of the present invention showing the pawl in an unlocked position permitting the cable to rewind.
Figure 10:
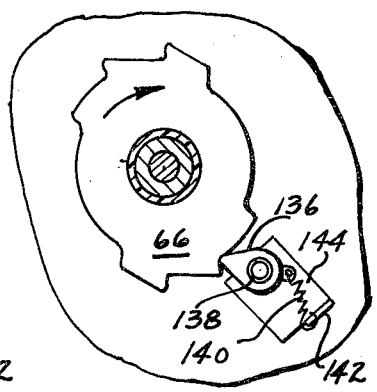
FIG. 10 is a view similar to FIG. 9 but showing the pawl in a locked position.

When the cable 16 is pulled to a position wherein the pawl 136 is within the ratchet teeth area and then allowed to retract, one of the teeth will engage the pawl 136 (as shown in FIG. 10) and stop the reel 14 from further rotation as biased by spring 38. To unlock, the cable 16 is pulled so that pawl 136 is returned to the neutral position. When the reel 14 is now allowed to retract or rewind, the pawl 136 assumes the position as shown in FIG. 9 and will not lock on the ratchet teeth.

Figure 11:
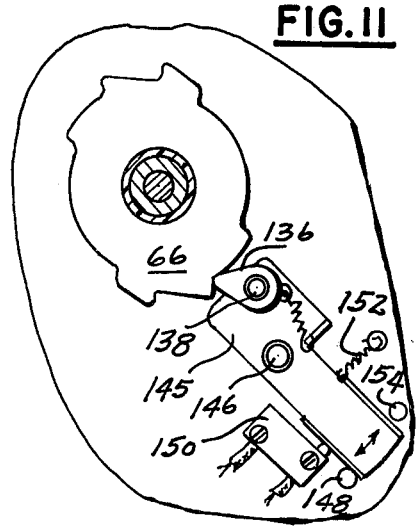
FIG. 11 is a view similar to FIGS. 9 and 10 but showing a modified form of the present invention wherein the pawl is pivotally mounted on a lever which itself is pivotally mounted on the reel assembly housing for limited movement toward and away from a control switch.

Referring to FIG. 11, a modified form of the invention is shown wherein the pawl 136 is mounted for rotation on boss 138 which, in turn, is mounted on a lever 145. Lever 145 is mounted for limited pivotal movement about a pin 146, mounted on the standard 36, under the control of a spring 152. Pivotal movement of lever 145 is limited by stops 148 and 154. The lever 145 is normally biased against stop 154 by spring 152 when pawl 136 is not engaged.

Figure 12:
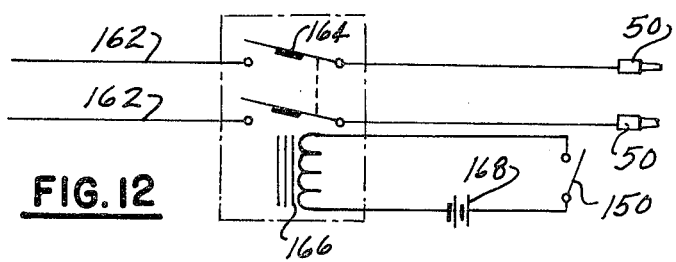
FIG. 12 is a schematic diagram of the electrical circuit forming a part of the present invention.

A limit switch 150 is also secured to the standard 36 substantially adjacent to the pin 148. When the lever 145 engages the pin 148, the limit switch 150 is also contacted and closed. The limit switch 150 is normally open, as shown in FIG. 12.

When the pawl 136 is engaged by one of the ratchet teeth as shown in FIG. 11, the return spring force of spring 152 is overcome causing the lever 145 to rotate against the stop 148 and close limit switch 150. The closed limit switch 150 actuates a power switch 166 for the input leads 160 and 162 to the cable 16 as shown in FIG. 12, which when closed allows input power to flow through plugs 50. The power switch 166 may be operated by battery 168 or any other separate power source.

Power through the cable 16 is only needed when the cable 16 has been unwound from the reel 14 to a useable position. De-energization of the cable 16, during winding and unwinding, substantially avoids shortening of the clips 26, electrical shock of the user and other safety hazards.

FIG. 3 illustrates another embodiment of the present invention. In this arrangement, two paired brush assemblies 96, 98 are incorporated into the reel assembly 10, if additional amperage is required.

We claim:

1. A reel assembly for a cable comprising in combination:
   a housing;
   a reel rotatably mounted on said housing and adapted to receive said cable;
   first bias means for biasing said reel towards a first state, said cable being substantially wound about said reel in said first state;
   interconnect means for interconnecting said cable and an external power supply, said interconnect means including a pair of conductive cups secured to said housing and a pair of brush assemblies secured to said reel, each of said conductive cups having a substantially annular ring portion substantially coaxial with said reel, each of said brush assemblies extending substantially radially with respect to said reel and including a brush adapted to wipingly engage one of said ring portions, said conductive cups and said brush assemblies being coupled to said external power supply and said cable, respectively;
   ratchet means operable in an engaged state for maintaining said reel in at least a second state wherein at least a portion of said cable is freed from said reel and operable in a disengaged state for permitting said reel to be rotated to said first state by said first bias means; and
   switch means operable in a first switch state for maintaining interconnection of said cable and said external power and operable in a second switch state for interrupting said interconnection of said cable and said external power supply;
   said switch means including a lever, pivotally mounted on said housing, and a switch, said lever operatively engaging and disengaging said switch whenever said ratchet means is in said engaged state and said disengaged state, respectively, said ratchet means including a ratchet mounted on said reel and a pawl rotatably mounted on said lever.

2. A reel assembly as claimed in claim 1 wherein said switch is closed whenever engaged by said lever.

3. A reel assembly as claimed in claim 1 further comprising second bias means for biasing said lever away from said switch.

4. A reel assembly as claimed in claim 1 further comprising a relay responsive to said switch.

5. A reel assembly as claimed in claim 1 further comprising dispenser means for dispensing said cable, said dispenser means being adapted to receive a pair of connectors secured to said housing.

6. A reel assembly as claimed in claim 5 wherein said housing includes a series of equally spaced connectors, whereby said dispenser means is securable to said housing at different orientations with respect thereto.

* * * * *